(12) United States Patent
Datta et al.

(10) Patent No.: US 7,203,078 B2
(45) Date of Patent: Apr. 10, 2007

(54) DUAL MODE RECTIFIER, SYSTEM AND METHOD

(75) Inventors: Rajib Datta, Albany, NY (US); Kunlun Chen, Shanghai (CN)

(73) Assignee: General Electric Company, Niskayuna, NY (US)

( * ) Notice: Subject to any disclaimer, the term of this patent is extended or adjusted under 35 U.S.C. 154(b) by 342 days.

(21) Appl. No.: 10/874,975

(22) Filed: Jun. 23, 2004

(65) Prior Publication Data

US 2005/0286279 A1    Dec. 29, 2005

(51) Int. Cl.
*H02M 5/45* (2006.01)
*H02M 7/00* (2006.01)

(52) U.S. Cl. ........................................ 363/37

(58) Field of Classification Search ................. 363/34, 363/37, 84, 89, 125–127; 322/14, 15, 17, 322/22–25, 28, 29, 75–77; 318/799–802, 318/806
See application file for complete search history.

(56) References Cited

U.S. PATENT DOCUMENTS

| | | | |
|---|---|---|---|
| 4,924,371 A | 5/1990 | Peterson | |
| 5,255,175 A | 10/1993 | Uchino | |
| 5,483,140 A * | 1/1996 | Hess et al. | 318/802 |
| 5,642,021 A | 6/1997 | Liang et al. | |
| 5,936,855 A | 8/1999 | Salmon | |
| 6,031,739 A | 2/2000 | He et al. | |
| 6,420,796 B1 | 7/2002 | Lagerwey | |
| 6,452,289 B1 | 9/2002 | Lansberry et al. | |
| 6,566,764 B2 | 5/2003 | Rebsdorf et al. | |
| 6,600,240 B2 | 7/2003 | Mikhail et al. | |
| 6,919,711 B2 * | 7/2005 | Haydock et al. | 322/24 |
| 2001/0005321 A1 | 6/2001 | Ichinose et al. | |
| 2002/0079706 A1 | 6/2002 | Rebsdorf et al. | |
| 2003/0151259 A1 | 8/2003 | Feddersen et al. | |
| 2006/0108954 A1 * | 5/2006 | Sebille et al. | 318/108 |

OTHER PUBLICATIONS

EPO Search Report Dated Sep. 28, 2005.
J. Ekanayake, et al. "Experimental Investigation of an Advanced Static VAr Compensator", IEEE Proc.-Gener. Transm. Distrib., vol. 142, No. 2, Mar. 1995, pp. 202-210.

* cited by examiner

*Primary Examiner*—Matthew V. Nguyen
(74) *Attorney, Agent, or Firm*—Ann M. Agosti; Patrick K. Patnode

(57) ABSTRACT

A system for generating an output power to a load is provided. The system comprises a generator configured for generating a variable frequency output power and a dual mode rectifier coupled to the generator and configured for being switched between a passive mode and an active mode. The dual mode rectifier comprises a passive rectifier coupled to output terminals of the generator and configured for operating in the passive mode and an active converter coupled to tappings from windings of the generator and configured for operating in the active mode.

33 Claims, 4 Drawing Sheets

DUAL MODE RECTIFIER, SYSTEM AND METHOD

BACKGROUND

The invention relates generally to power systems and more specifically to a method and system for a dual mode rectifier.

Many devices, such as power supply systems, operate on power drawn from generators. The generator, in turn, draws power from systems such as wind turbines, gas or diesel-driven engines, turbines, or any other suitable drive system. The output of the generator is typically a variable frequency output power.

Typically, rectifiers are used to convert the variable frequency output power to a fixed frequency output power. Converters are then used to convert the fixed frequency output power to a desired frequency output power, which is then provided to various loads such as grid. In other applications, such as motors, power converters are designed to draw power from a grid and provide the power to the motor.

Rectification can be of two types namely passive rectification or active rectification. Passive rectification is performed using diode bridges. Passive rectifiers deliver power from an active source with high efficiency but do not provide control over the power drawn from the source. In addition, passive rectification introduces harmonics in the ac side current, which cause undesirable torque harmonics when the active source is a generator or unacceptable distortions when the active source is the power grid.

Active rectifiers, on the other hand, can be controlled as they are implemented using switches. One problem with active rectifiers is the associated cost. In addition, active rectifiers operate at a lower efficiency due to losses caused by the switching action of the semiconductor devices.

In many applications, low speed high torque generators are required. Such generators are larger in size than generators running at higher speeds. The size of the generator also increases if it is operated at lower power factor. The large size of the generator in turn increases the cost substantially.

Therefore, what is desired is a rectifier system that operates at a high power factor and high efficiency while minimizing the cost and the size of the rectifier system.

BRIEF DESCRIPTION

Briefly, according to one aspect of the invention, a system for generating an output power to a load is provided. The system comprises a generator configured for generating a variable frequency output power and a dual mode rectifier coupled to the generator and configured for being switched between a passive mode and an active mode. The dual mode rectifier comprises a passive rectifier coupled to output terminals of the generator and configured for operating in the passive mode and an active converter coupled to tappings from windings of the generator and configured for operating in the active mode.

In another embodiment, a dual mode rectifier configured for being switched between a passive mode and an active mode is provided. The dual mode rectifier comprises a passive rectifier coupled to output terminals of a generator and configured for operating in the passive mode and an active converter coupled to tappings from windings of the generator and configured for operating in the active mode. The dual mode rectifier is configured for providing power to a load.

In an alternate embodiment, a method for generating an output power to a load is provided. The method comprises generating a variable frequency output power and rectifying the variable frequency output power to dc, which is inverted, to output power. The rectifying step comprises operating in an active mode when the output power is below a first threshold value and operating in a passive mode when the output power is above a second threshold value.

In a further embodiment a system for generating an output power to a load is provided. The system comprises a generator configured for generating a variable frequency output power, a wind turbine coupled to the generator and a dual mode rectifier. The dual mode rectifier is coupled to the generator and configured for being switched between a passive mode and an active mode. The dual mode rectifier comprises a passive rectifier coupled to output terminals of the generator and configured for operating in the passive mode and an active converter coupled to tappings from windings of the generator and configured for operating in the active mode. The system further comprises control circuitry configured for causing the active converter to provide active power when the generator is operating at or below a first speed and for causing the passive rectifier to provide power when the generator is operating at or above a second speed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
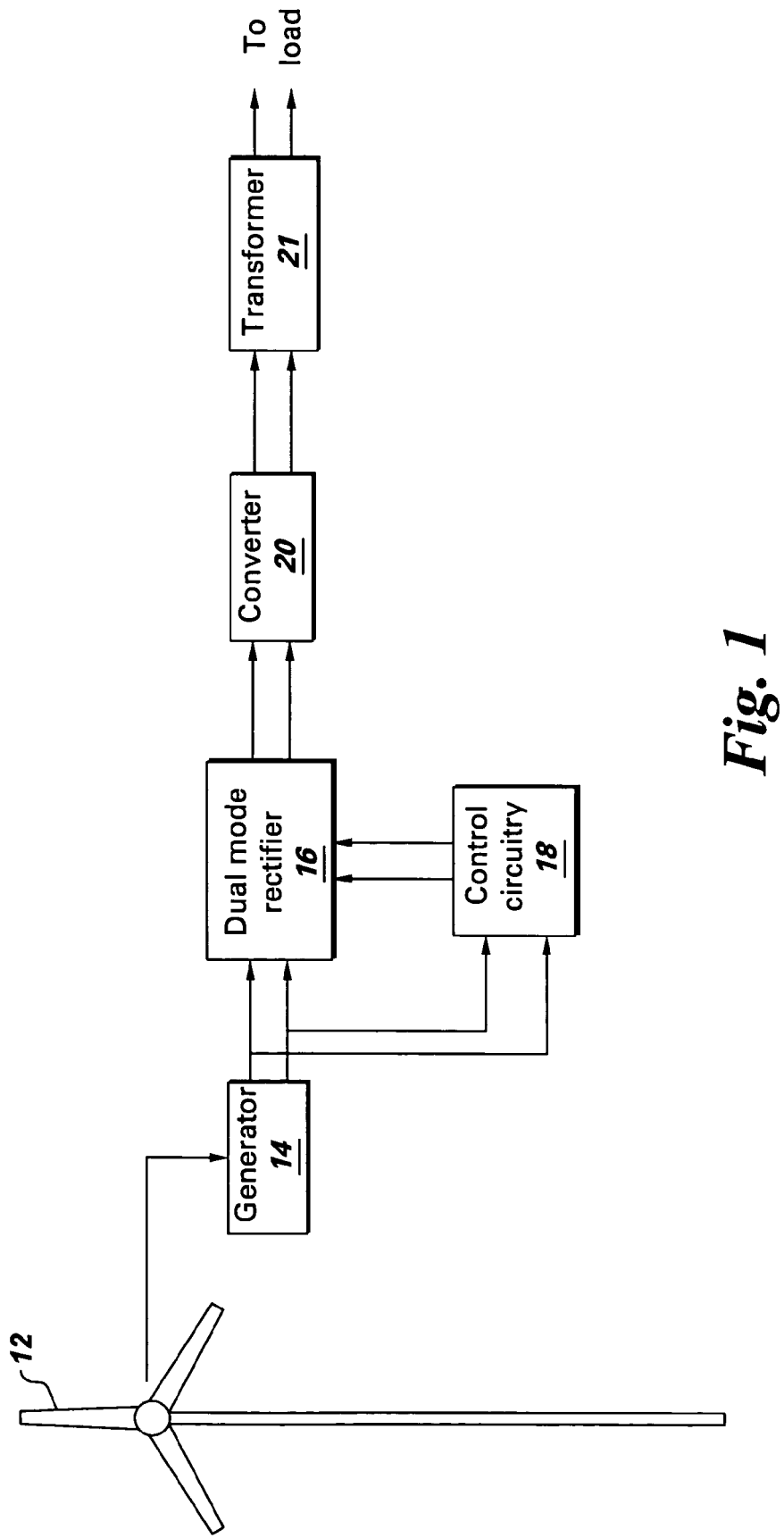
FIG. 1 is a block diagram of one embodiment of a power system implemented according to one aspect of the invention.

In one embodiment of the invention a power system 10 for providing a power load is provided as shown on FIG. 1. The power system comprises a wind turbine 12, generator 14, dual mode rectifier 16, control circuitry 18, converter system 20 and transformer 22. Each component of the power system is described in further detail below.

A wind turbine 12 is configured for converting wind energy to mechanical energy. Wind energy is captured by the rotation of the wind turbine's blades. The tips of the blades travel at a speed ranging typically from about 50 meters per second (m/s) to about 70 m/s. Mechanical power generated by the blades is transferred to a transmission system (not shown), which typically has an input of 20–50 rotations per minute (rpm) from a low-speed shaft attached to the blade and an output of 1000–1800 rpm (may be higher for 60 Hz grid) for a high-speed shaft that is coupled to generator 14. In another embodiment, the mechanical power generated by the blade is transferred directly to the generator.

It should be noted that the wind turbine system shown and described herein is discussed for exemplary purposes only. Many other types of power generation systems can be envisaged for providing power to the downstream circuitry described below both during first or normal modes of operation, and second, special or fault modes. Similarly, as will be appreciated by those skilled in the art, the particular circuitry needed for conversion of the output of such power generation equipment may vary, particularly depending upon the electrical characteristics of the output power (e.g. voltage, current and frequency).

Continuing with FIG. 1, generator 14 comprises a rotor and a stator (not shown), respectively, and is configured for generating a variable frequency output power. The rotor typically comprises magnetic/electromagnetic elements and is configured to provide an electromagnetic field. The rotor is coupled to a shaft that is in motion due to the rotational motion of the wind turbine. Due to the motion of the rotor, the electromagnetic field is cut and a corresponding alternating current is produced in the stator. The alternating current is provided to dual mode rectifier 16. In a specific embodiment, the generator is a synchronous generator.

Dual mode rectifier 16 is configured for being switched between a passive mode and an active mode. The dual mode rectifier comprises a passive rectifier coupled to output terminals of the generator and configured for operating in the passive mode and an active converter coupled to tappings from windings of the generator and configured for operating in the active mode. The operation of the dual mode rectifier is described in more detail with reference to FIG. 2. The dual mode rectifier is configured for providing power from the generator to converter system 20.

Continuing with FIG. 1, control circuitry 18 senses a speed of operation of generator 14 and is configured for switching the dual mode rectifier to an active mode or passive mode based on the sensed speed of operation. The control circuitry is configured for causing the active converter to provide active power to converter system 20 when the generator is operating at or below a first speed. Also, the control circuitry is further configured for causing the passive rectifier to provide power when the generator is operating at or above a second speed.

Converter system 20 is configured for converting the variable frequency output power received from generator 14 to a constant frequency output power. Typically, the constant frequency ranges between 49–60 Hertz. The constant frequency output power is provided to transformer 22. The transformer 22 steps up the constant frequency output power to a desirable level. The stepped up power is provided to the load. Examples of load include grid, motors, resistive loads, etc.

Figure 2:
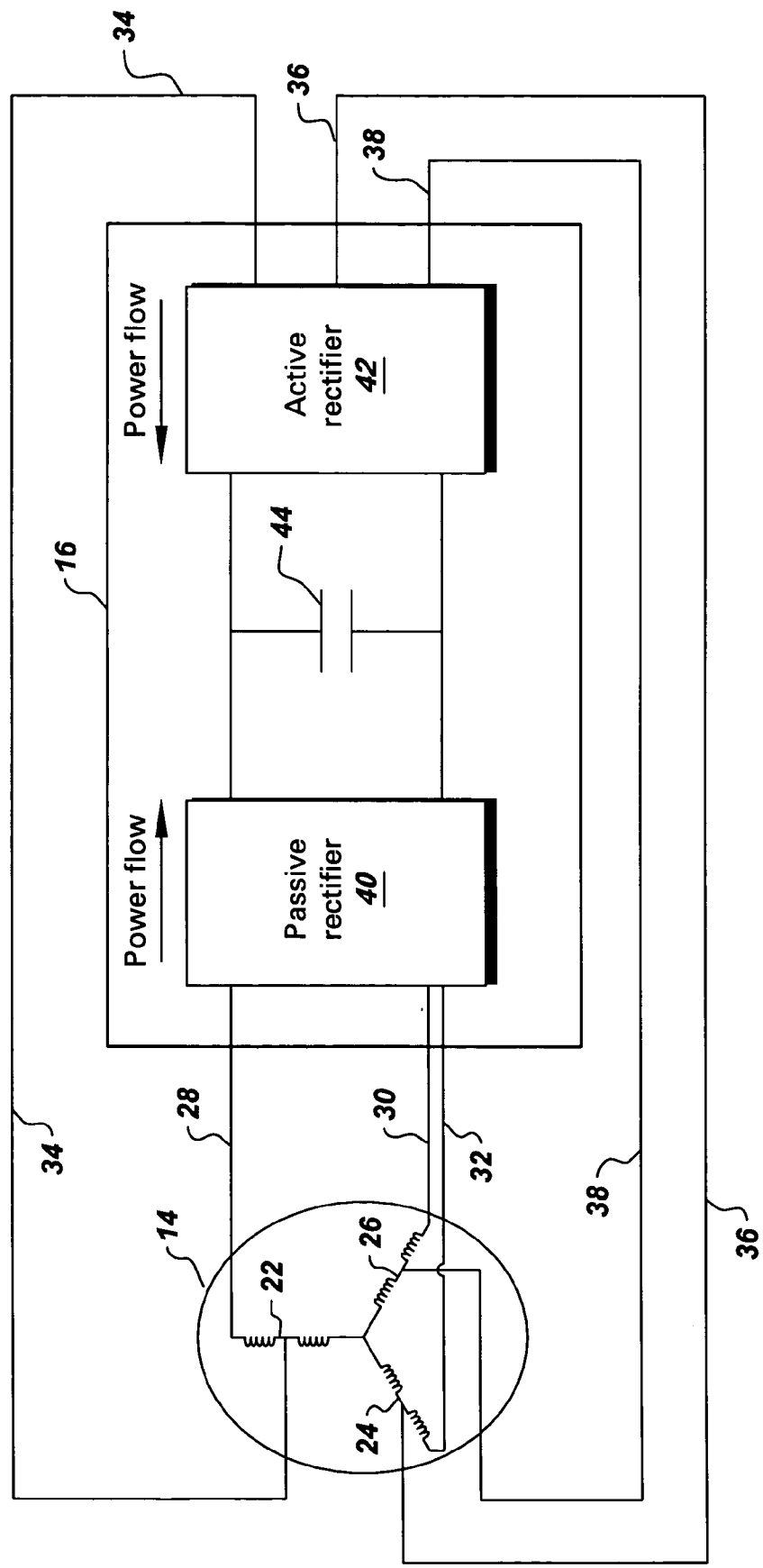
FIG. 2 is a block diagram illustrating a manner in which a dual power rectifier is coupled to a generator according to one aspect of the invention.

As described above, dual mode rectifier 16 is configured to provide power to generator 20. FIG. 2 illustrates a block diagram of an embodiment of generator 14 and dual mode rectifier 16. Each component is described in further detail below.

Generator 14 comprises three phase windings 22, 24 and 26 respectively. The output terminals of the generator are 28, 30 and 32 respectively. Generator 14 additionally has tappings from windings namely 34, 36 and 38 respectively. The output terminals of the generator, that is, 28, 30 and 32 are coupled to passive rectifier 40. The tappings 34, 36 and 38 from the windings are coupled to active converter 42. DC link capacitor 44 is used for coupling the passive rectifier and the active converter. The voltage across the capacitor is maintained at a constant value. The constant value varies based on various parameters such as a phase of the generator, the terminal voltage of the generator, etc. In one embodiment, the constant value ranges from 1 kV to 6 KV The turns-ratio of the tappings to the windings is determined based on the dc link voltage, the maximum modulation index of the active converter and the power-speed characteristics of the generator prime-mover.

Figure 3:
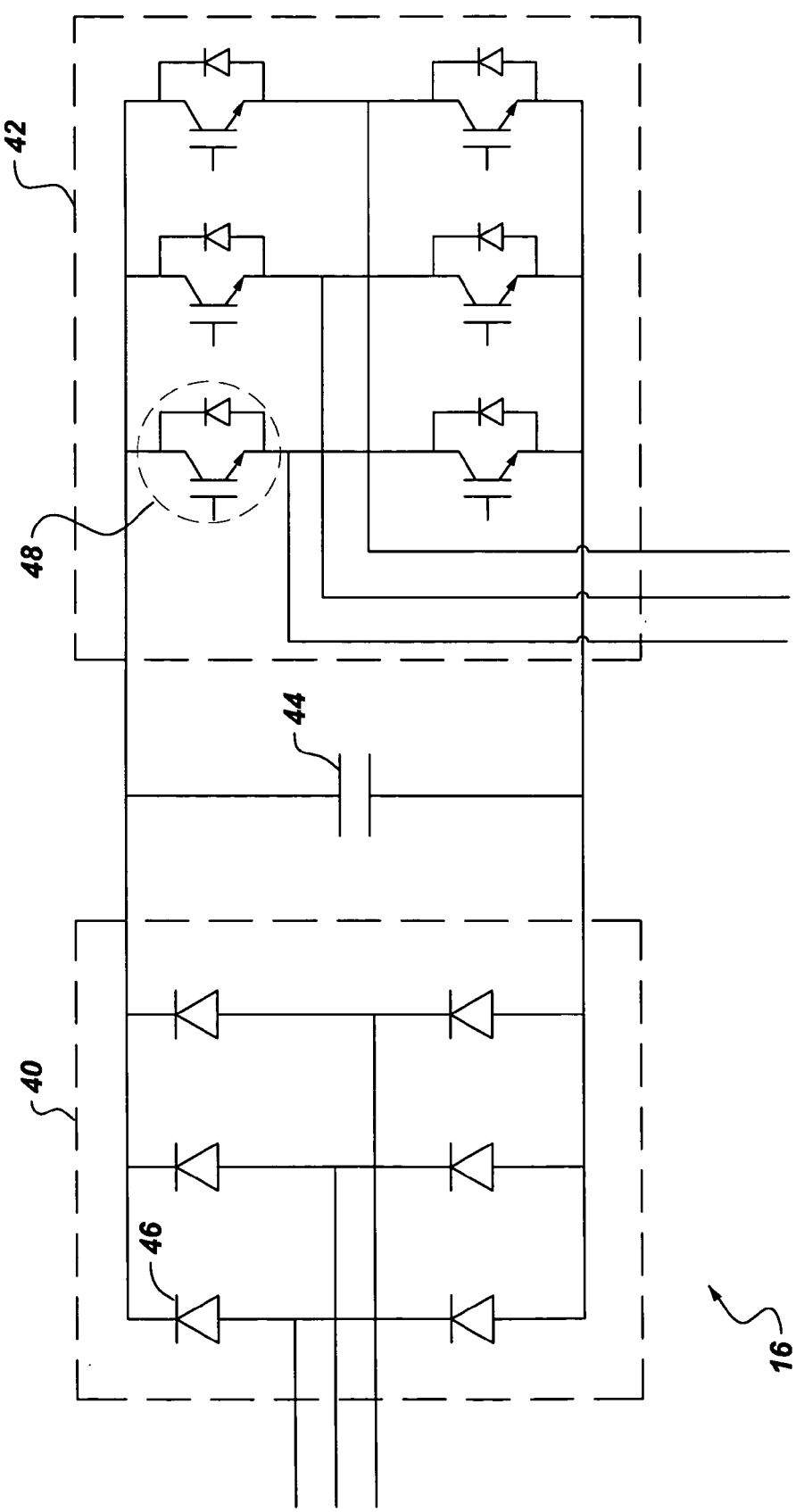
FIG. 3 is a circuit diagram illustrating the various components of an embodiment of a dual mode rectifier.

The dual mode rectifier comprises passive rectifier 40 and active converter 42. The passive rectifier is configured for operating in the passive mode and the active converter coupled to tappings from windings of the generator and configured for operating in the active mode. In the illustrated embodiment, the passive rectifier is implemented using a diode bridge as shown in FIG. 3. Diode bridge comprises a plurality of diodes 46 as shown in FIG. 3.

The active converter is implemented using switches 48 as illustrated in FIG. 3. In the illustrated embodiment, switches 48 are implemented using insulated gate bipolar transistors (IGBT). The manner in which the dual mode rectifier operates is described in further detail below.

When the wind turbine 12 is starting up, the generator 14 operates at a first speed. As a result, the output voltage of the generator is lower than the voltage across capacitor 44 causing the passive rectifier to be reverse biased. The dual mode rectifier receives signals form control circuitry 18 for causing the dual mode rectifier to operate in an active mode. In the active mode, the active converter is operational and provides power to the load through the converter system. The dual mode rectifier operates in active mode when the generator is operating at or below the first speed. In an embodiment, the first speed ranges from about 0.75 per unit to 0.8 per unit.

When the wind turbine gains speed, there is a corresponding increase in the generator speed. As a result, the output voltage of the generator is higher than the voltage across capacitor 44. The dual mode rectifier receives signals form control circuitry 18 for causing the dual mode rectifier to operate in a passive mode when the generator is operating at or above a second speed. In an embodiment, the second speed rangers from about 0.80 per unit to about 0.85 per unit. The higher generator voltage causes the passive rectifier to be forward biased. The dual mode rectifier now provides power to the converter system through the passive rectifier when the generator is operating at or above the second speed. In one embodiment, the second speed is greater than the first speed. In an alternative embodiment, the second speed is equal to the first speed.

The first speed and the second speed are selected based on the back emf of the generator and such that the current in the active converter is minimized. In one embodiment, when the generator is operating at low speeds, the internal power factor is controlled at unity, which enables maximum torque per ampere operation of the generator. As described above, the diodes of the passive rectifier are reverse biased during low speed and the active power is transferred through the active converter.

As the generator operates at higher speeds, the diodes of the passive rectifier are forward biased, and the control circuitry causes the passive rectifier to deliver power to the load. In an embodiment, when the dual mode rectifier is operating in the passive mode, the active converter delivers a reactive current in the generator windings to regulate the output voltage of the generator. Controlling the output voltage of the generator at a desired level ensures the diodes of the passive rectifier to be forward biased, thus delivering the power to the load. The generator operates at a leading power factor with respect to the output voltage and a lagging power factor with respect to the back emf. In a further embodiment, the active converter is further configured to inject harmonic currents in appropriate phase and frequency so as to effectively cancel the harmonic currents introduced by the passive rectifier in the generator winding.

Figure 4:
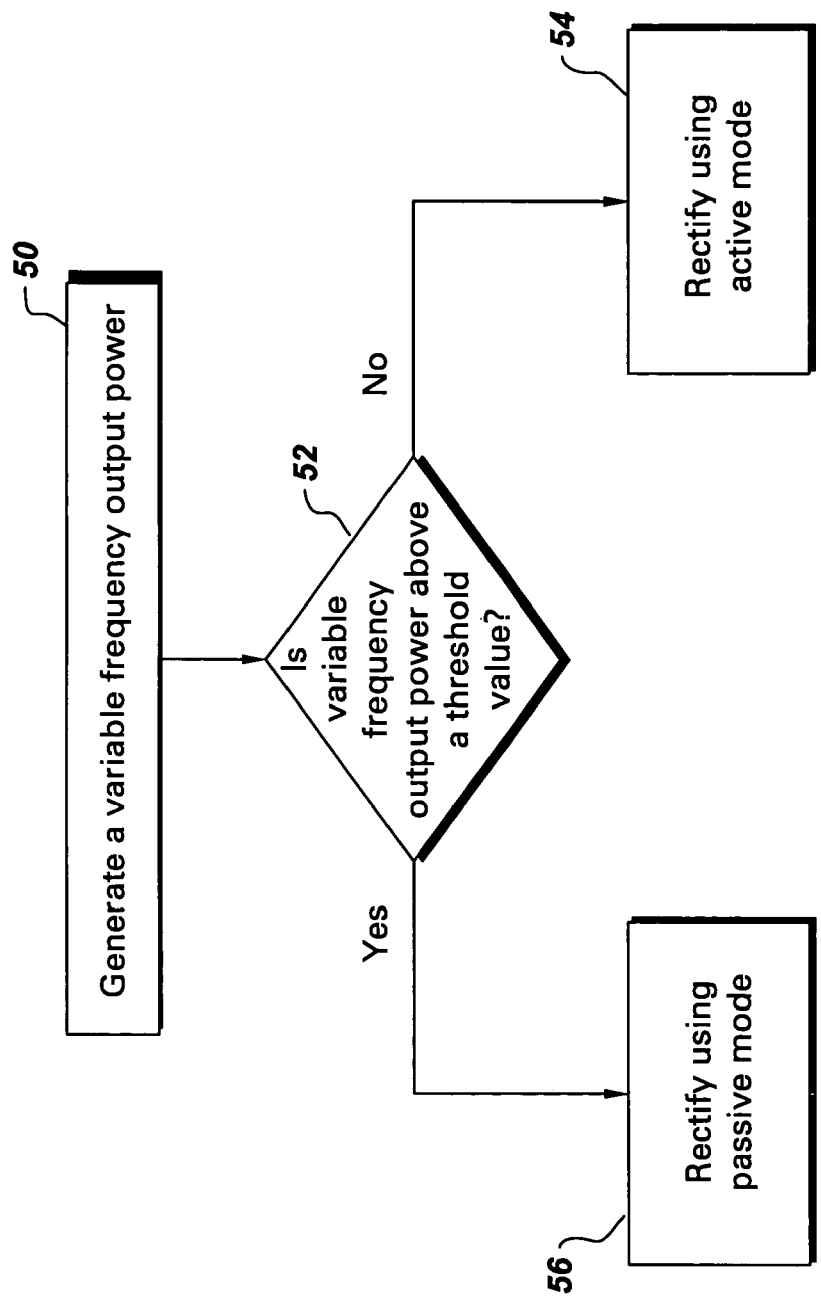
FIG. 4 is a flow chart illustrating one method by which power may be delivered to a load.

FIG. 4 is a flow chart describing one method by which the power can be supplied to a load. Each step is described in further detail below. In step 50, a variable frequency output power is generated. In one embodiment, a generator coupled to a turbine is used for the generation of the variable frequency output power. In a further embodiment, the generator is a synchronous generator and the turbine comprises a wind turbine.

In step 52, the variable frequency output power is compared to at least one threshold value. If the variable frequency is lower than the threshold value, the variable frequency output power is rectified in an active mode as shown in step 54. In a more specific embodiment, for active rectification the threshold value comprises a first threshold value. If the variable frequency is higher than the threshold value, the variable frequency output power is rectified in a passive mode as shown in step 56. In a more specific embodiment, for passive rectification the threshold value comprises a second threshold value which may be the same as or different from the first threshold value.

In an embodiment, the method further comprises inducing a reactive current in a generator when the output power is above the threshold value. The reactive current is used to regulate the output voltage of the generator. In a further embodiment, the method further comprises minimizing net harmonic currents in the generator to reduce torque pulsations.

The above-described invention has many advantages that include the enabling of maximum torque-per ampere control of the generator in the low-speed range and constant terminal voltage operation in the high-speed range. The generator current and power factor is optimized over the entire speed range enabling optimization of generator size, cost and weight. In addition, the active converter also acts as a harmonic compensator thus enabling the generator to operate with low torque ripple and low harmonic losses over the entire operating range. By using the passive rectifier to deliver power to the load while the generator is operating at higher speeds, the dual mode rectifier has a higher efficiency compared to the using the active rectifier in the high-speed region. Also, the overall cost is reduced due to reduction of the active converter rating to about 40–60%.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for generating an output power to a load, the system comprising:
   a generator configured for generating a variable frequency output power; and
   a dual mode rectifier coupled to the generator and configured for being switched between a passive mode and an active mode, wherein the dual mode rectifier comprises:
      a passive rectifier coupled to output terminals of the generator and configured for operating in the passive mode; and
      an active converter coupled to tappings from windings of the generator and configured for operating in the active mode; and
   control circuitry configured for causing the active converter to provide active power when the generator is operating at or below a first speed.

2. The system of claim 1, wherein the control circuitry is further configured for causing the passive rectifier to provide power when the generator is operating at or above a second speed.

3. The system of claim 2, wherein the first speed is equal to the second speed.

4. The system of claim 2, wherein the second speed is higher than the first speed.

5. The system of claim 2, wherein the first speed ranges from about 0.75 per unit to 0.8 per unit.

6. The system of claim 2, wherein the second speed ranges from about 0.8 per unit to 0.85 per unit.

7. The system of claim 2, wherein the control circuitry is further configured for causing the active converter to induce a reactive current in the generator when the generator is operating at or above the second speed.

8. The system of claim 7, wherein the control circuitry is further configured to use the reactive current for regulating an output voltage of the generator.

9. The system of claim 1, wherein the active converter is further configured to induce harmonic currents to cancel harmonic currents introduced by the passive rectifier in the generator winding.

10. The system of claim 1, further comprising a turbine coupled to the generator.

11. The system of claim 10, wherein the turbine comprises a wind turbine.

12. A dual mode rectifier configured for being switched between a passive mode and an active mode, the dual mode rectifier comprising:
   a passive rectifier coupled to output terminals of a generator and configured for operating in the passive mode; and
   an active converter coupled to tappings from windings of the generator and configured for operating in the active mode,
   wherein the dual mode rectifier is configured for providing power to a load through the passive rectifier during the passive mode and the active rectifier during the active mode.

13. The dual mode rectifier of claim 12, wherein the active converter is configured to provide active power to the load when the generator is operating at or below a first speed.

14. The dual mode rectifier of claim 11, wherein the passive rectifier is configured to provide power to the load when the generator is operating at or above a second speed.

15. The system of claim 13, wherein a control circuitry coupled to the dual mode rectifier is configured for causing the active converter to induce a reactive current in the generator when the generator is operating at or above the second speed.

16. The system of claim 15, wherein the reactive current can be used to regulate an output voltage of the generator.

17. The system of claim 11, wherein the active converter is further configured to inject harmonic currents to cancel harmonic currents introduced by the passive rectifier in the generator winding.

18. The dual mode rectifier of claim 11, wherein the passive rectifier comprises diodes.

19. The dual mode rectifier of claim 11, wherein the active converter comprises active switches.

20. A method for generating an output power to a load, the method comprising:
   generating a variable frequency output power; and
   rectifying the variable frequency output power to output power; wherein the rectifying comprises operating in an active mode when the output power is below a first threshold value, and operating in a passive mode when the output power is above a second threshold value.

21. The method of claim 20, wherein rectifying further comprises controlling a passive rectifier to operate when the output power is above the second threshold value and an active converter to operate when the output power is below the first threshold value.

22. The method of claim 20, wherein the first threshold value is equal to the second threshold value.

23. The method of claim 20, wherein the second threshold value is greater than the first threshold value.

24. The method of claim 20, wherein the first threshold value is 0.4 to 0.5 per unit.

25. The method of claim 20, wherein the second threshold value is 0.5 to 0.6 per unit.

26. The method of claim 20, further comprising inducing a reactive current in a generator when the output power is above the second threshold value.

27. The method of claim 20, further comprising minimizing harmonic currents in the generator.

28. The method of claim 26, further comprising regulating an output voltage of the generator using the reactive current.

29. A system for generating an output power to a load, the system comprising:

a generator configured for generating a variable frequency output power;

a wind turbine coupled to the generator;

a dual mode rectifier coupled to the generator and configured for being switched between a passive mode and an active mode, wherein the dual mode comprises:

a passive rectifier coupled to output terminals of the generator and configured for operating in the passive mode;

an active converter coupled to tappings from windings of the generator and configured for operating in the active mode; and control circuitry configured for causing the active converter to provide active power when the generator is operating at or below a first speed and for causing the passive rectifier to provide power when the generator is operating at or above a second speed.

30. The system of claim 29, wherein the first speed is equal to the second speed.

31. The system of claim 29, wherein the second speed is higher than the first speed.

32. The system of claim 29, wherein the control circuitry is further configured for causing the active converter to induce a reactive current in the generator when the generator is operating at or above the second speed.

33. The system of claim 32, wherein the control circuitry is further configured to use the reactive current for regulating an output voltage of the generator.

* * * * *